Figure 1:
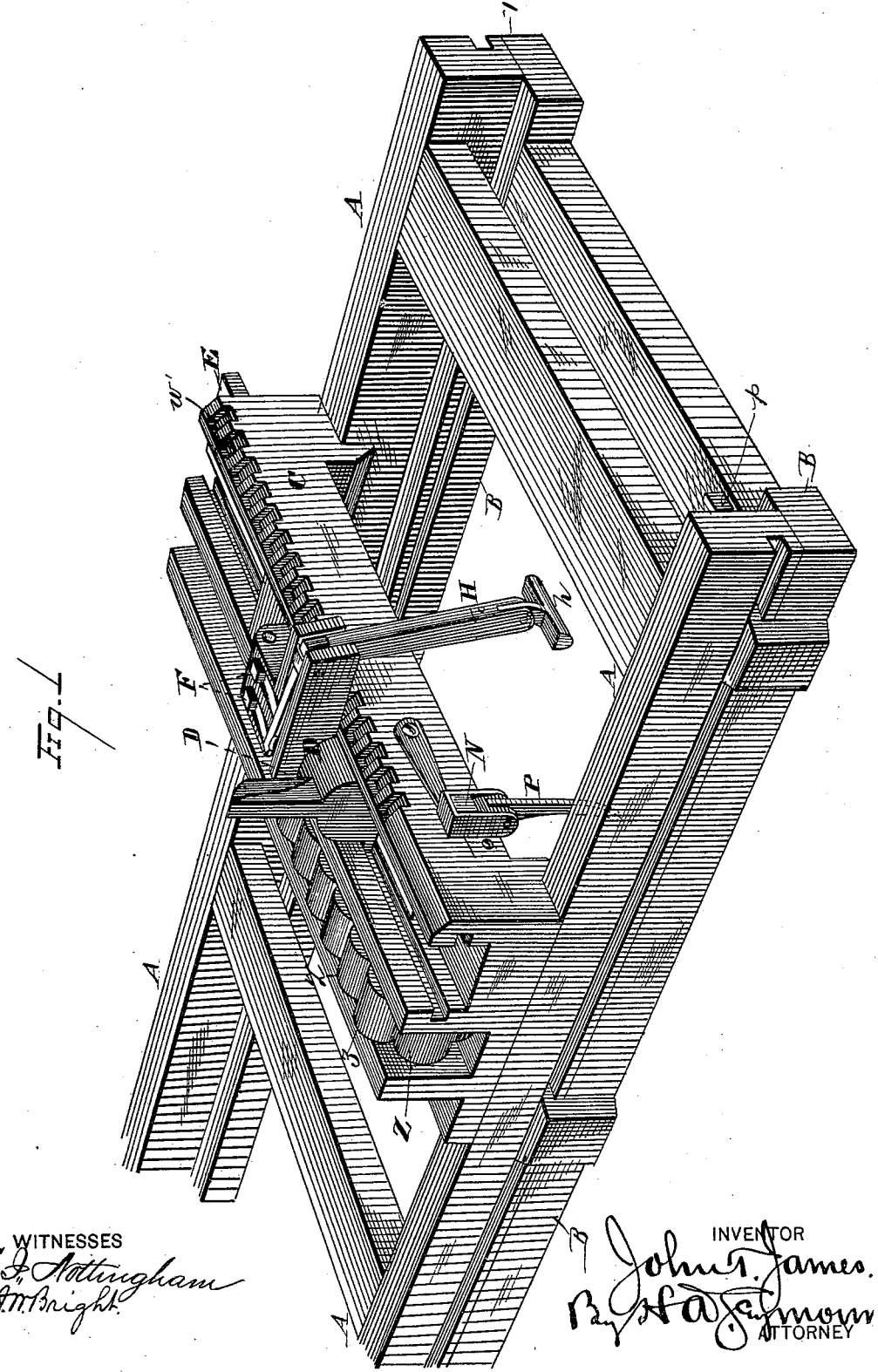

4 Sheets—Sheet 1

J. T. JAMES.
Head-Block for Saw-Mills.

No. 212,383. Patented Feb. 18, 1879.

WITNESSES
E. J. Nottingham
A. M. Bright

INVENTOR
John T. James.
By H. A. Seymour
ATTORNEY

N. PETERS, PHOTO-LITHOGRAPHER, WASHINGTON, D. C.

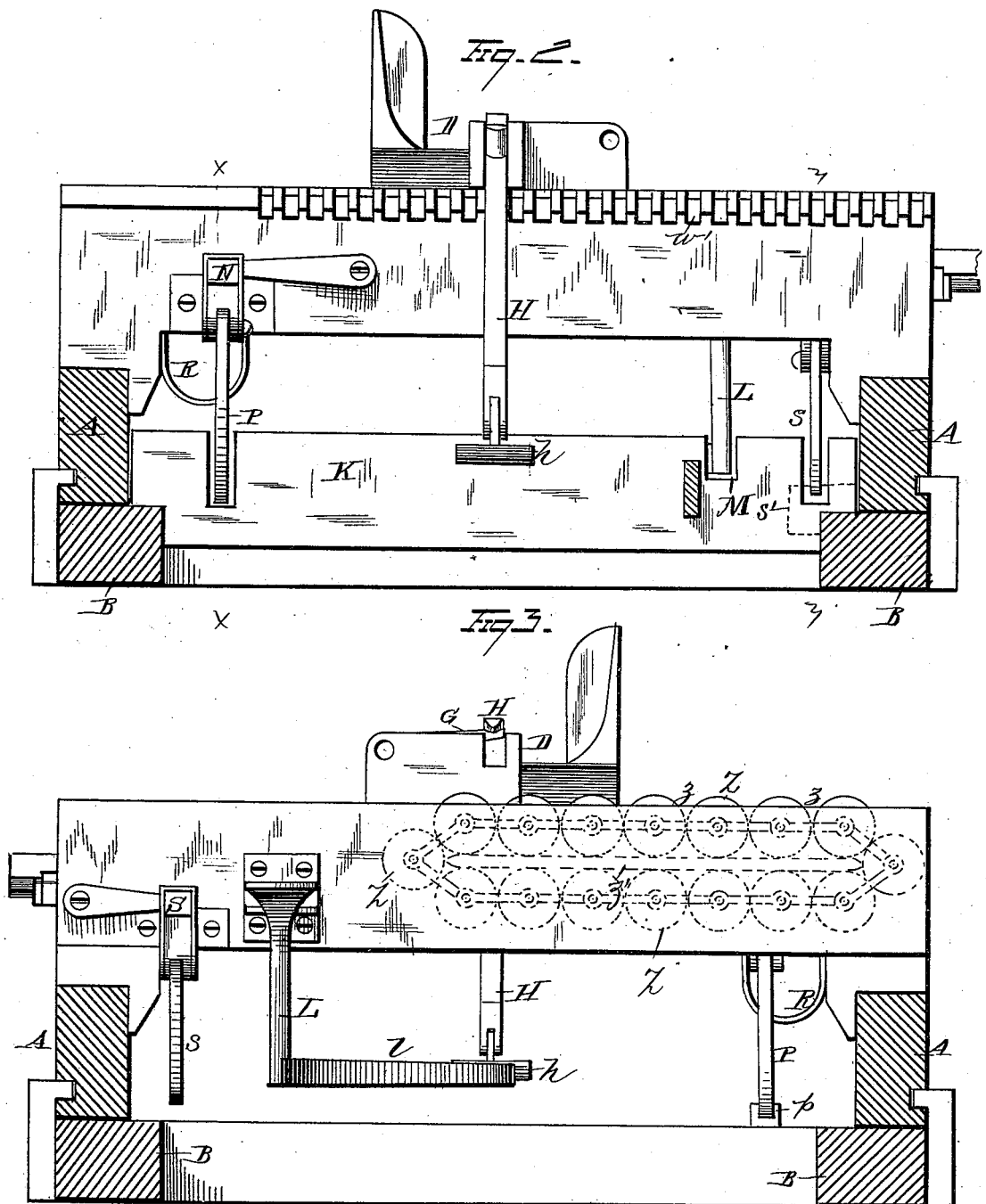

J. T. JAMES.
Head-Block for Saw-Mills.
No. 212,383. Patented Feb. 18, 1879.
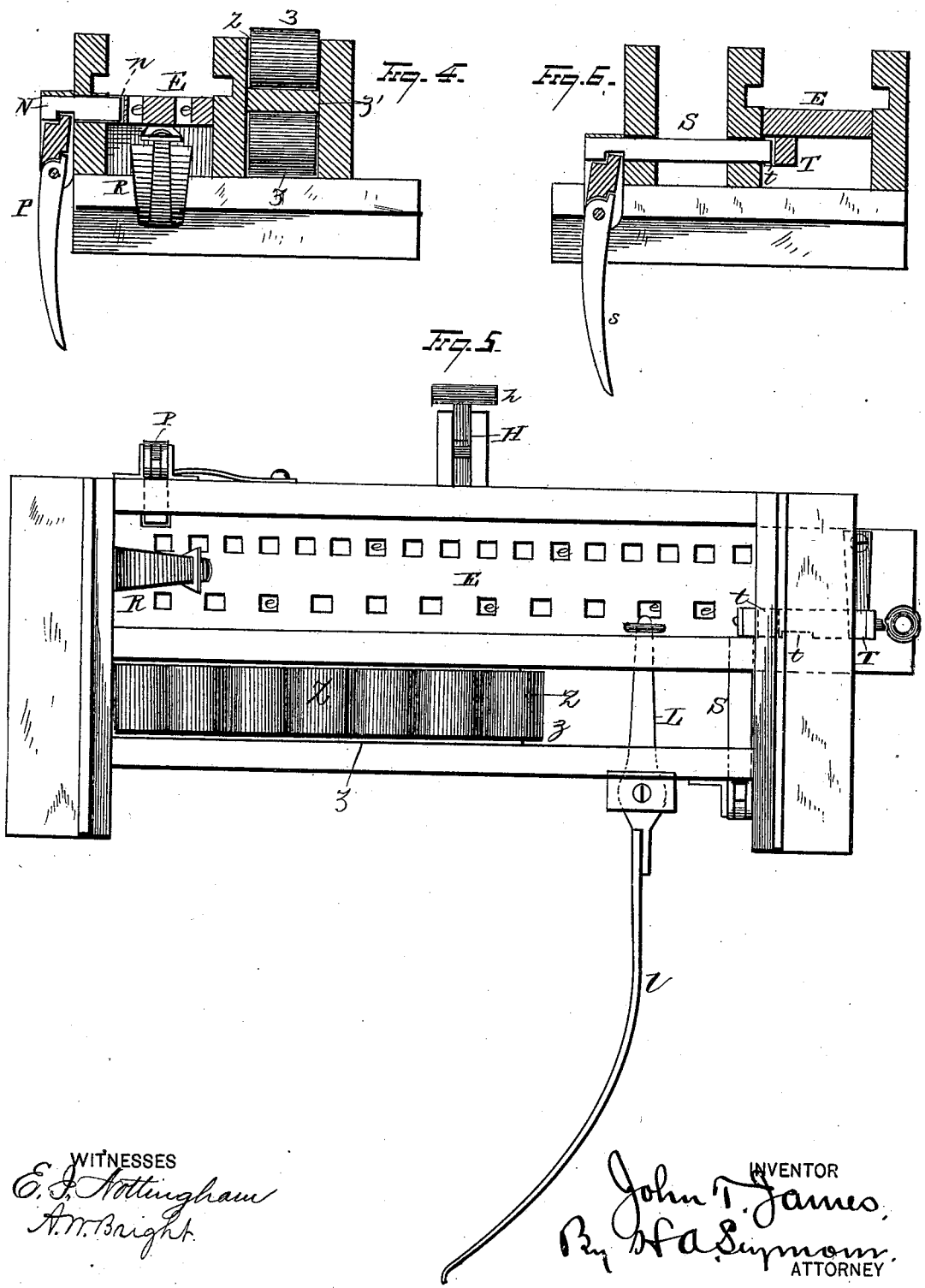

4 Sheets—Sheet 4.
J. T. JAMES.
Head-Block for Saw-Mills.
No. 212,383. Patented Feb. 18, 1879.
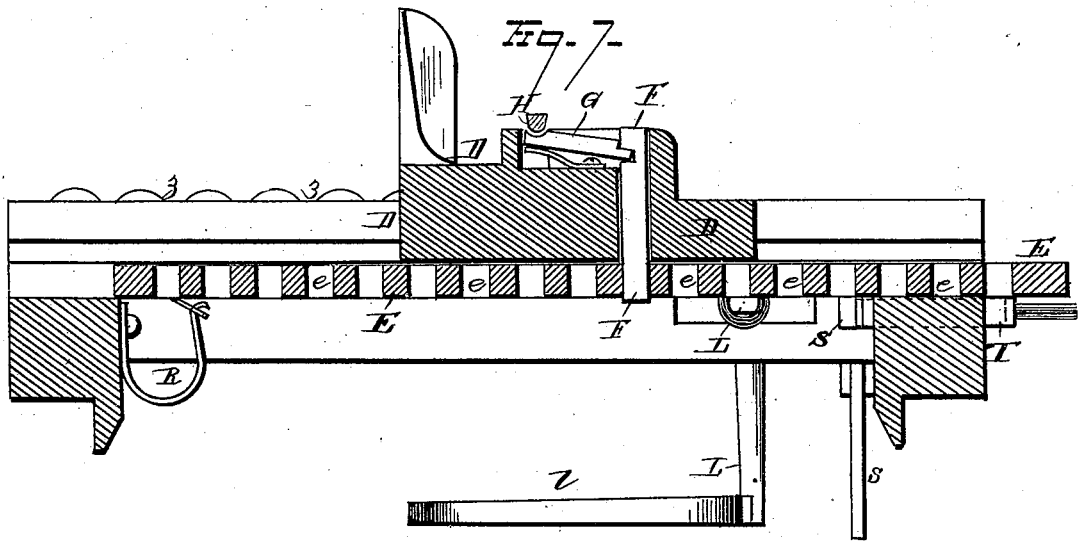
Fig. 7.
Fig. 8.
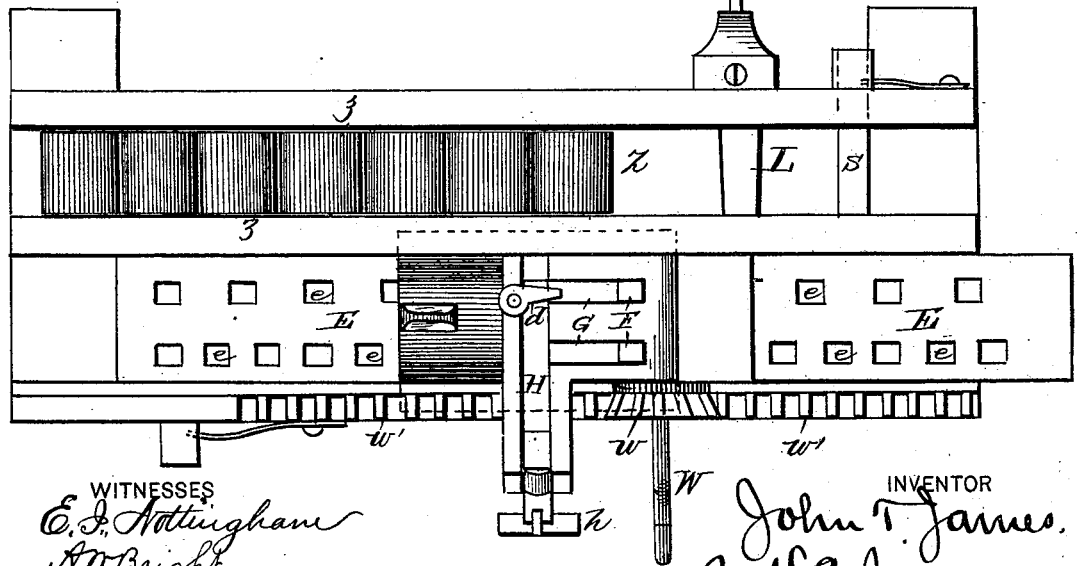
WITNESSES
E. I. Nottingham
A. W. Bright
INVENTOR
John T. James
By H. A. Symons
ATTORNEY
N. PETERS, PHOTO-LITHOGRAPHER, WASHINGTON, D. C.

UNITED STATES PATENT OFFICE.

JOHN T. JAMES, OF LOVE'S MILLS, ASSIGNOR TO HIMSELF AND ANDREW KELLY, OF WASHINGTON COUNTY, VIRGINIA.

IMPROVEMENT IN HEAD-BLOCKS FOR SAW-MILLS.

Specification forming part of Letters Patent No. 212,383, dated February 18, 1879; application filed September 11, 1878.

*To all whom it may concern:*

Be it known that I, JOHN T. JAMES, of Love's Mills, in the county of Washington and State of Virginia, have invented certain new and useful Improvements in Head-Blocks for Saw-Mills; and I do hereby declare the following to be a full, clear, and exact description of the invention, such as will enable others skilled in the art to which it pertains to make and use it, reference being had to the accompanying drawings, which form part of this specification.

My invention relates to certain improvements in head-blocks for saw-mills, and is designed to provide head-blocks which will automatically adjust themselves toward the saw, so as to properly set the log preparatory to each successive sawing thereof.

In the drawings, Figure 1 is a view in perspective of part of a saw-mill carriage provided with the invention. Fig. 2 represents a head-block in elevation view of one side thereof. Fig. 3 represents a similar view of the opposite side. Fig. 4 is a sectional view through line $x\ x$ of Fig. 2. Fig. 5 is a reverse plan view of the head-block. Fig. 6 is a sectional view through line $y\ y$ of Fig. 2. Fig. 7 is a longitudinal sectional view of the head-block. Fig. 8 represents a manner of using the head-block, as hereinafter described.

A section only of the carriage is represented, the same showing one of the two head-blocks for better illustration of my invention, though it will be understood that the latter applies alike to both front and rear head-blocks. The description which immediately follows speaks of these head-blocks as if both were shown in the drawings; but after such preliminary description the mechanical parts of one only of the same are referred to.

The carriage A may be of any desired construction, adapted, by mechanism of a suitable character, to be gigged forward and backward upon the ways B. It is provided with two head-blocks, C, which are made alike, and provided with similar mechanical devices, which operate in the same way to simultaneously adjust the knees D to or from the saw.

The construction is such with each of the two blocks that at the same time their respective knees are carried toward the saw by a corresponding movement of the slides E, with which they, respectively, are connected. This movement is just prior to the forward gigging of the carriage, and serves to automatically "saw-set" the log. After the carriage has carried the log beyond the saw, and just prior to its return gigging, these respective knees are disconnected with the slides, and the latter are moved in a line of direction away from the saw. As soon as this movement of the slides is accomplished the respective knees are again connected with the same, and the carriage is then gigged backward to its former starting-point, and the operations above described are repeated.

The adaptation of parts, and the mechanism used in causing the intermittent reciprocating movement of the slides, together with the suitable connection and disconnection of their respective knees, being the same with both of the head-blocks, a detail description of one of the same will be sufficient, it being understood that the same applies alike to both of said head-blocks. The slide E is provided with suitable perforations $e$, which may be formed in longitudinal rows of one, two, or more, said rows having their perforations formed at any desired distance relative to each other.

Pins F pass vertically through openings in the knee, and are pressed downward by suitable elastic or spring means, so that they tend to constantly engage with the perforated slide. They may be one, two, or more in number, corresponding to the number of rows of perforations formed in the slide. Horizontal levers G engage with these pins, and are themselves adapted to be engaged by the bell-crank lever H, pivoted to the side of the knee. This bell-crank lever has movement in a vertical plane, and is provided with a tilting catch, $h$, pivoted to its lower arm extremity, and which is adapted to be tilted or moved on its pivot in a direction forward and upward, but not rearward. Hence, as the carriage is gigged backward this catch rides easily over the cross-bar K without operating the bell-crank lever; but when the carriage is gigged forward this catch engages with said cross-bar and moves the bell-crank lever so that the latter bears down upon the free ends of the horizontal levers, and the spring-pressed pins are raised from out of the perforations in the slide, and the latter is disconnected from the knee.

Since the knee slides in ways which support it, it is evident that when this pin-connection of the knee with the slide located below it is disengaged, the slide can be moved away from the saw without affecting the position of the knee. A fastening, $d$, of any desired form, may be used to hold the bell-crank lever in such a position as to maintain the pins raised from their connecting perforations in the slide, so that the knee may itself be moved in its supporting ways either to or from the saw independently of said slide.

The reciprocating movement of the slide is caused as follows: A bell-crank lever, L, pivoted to the forward side of the carriage, so as to have movement in a horizontal plane, engages with the slide at one extremity, while the opposite extremity is provided with an elastic arm, $l$, preferably made of spring metal. This spring-arm engages with a guide, M, secured to the carriage-way, and so located with reference to the head-block that while the carriage is being gigged backward an engagement between said spring-arm and guide takes place, which tends to operate the lever so as to move the slide toward the saw. But in order to cause this movement of the slide to be restrained until the carriage has reached such a point in its return gigging as to cause the forward end of the log to be clear of the saw, a spring-pressed catch, N, engages in a suitable recess, $n$, formed in the slide. This catch is connected with a pendent lever, P, whose free end is adapted to engage with a stop, $p$, formed on the carriage-way, said stop being so located with reference to the head-block that just before the carriage reaches the end of its return gigging said stop engages the lever and causes the catch N to be disconnected with the slide. As soon as this disconnection takes place the gathered force of the spring-arm $l$, which latter by this time is very tense, has free opportunity to spend itself, and the slide is suddenly moved toward the saw, carrying the knee with it.

The log is thereby automatically set for the next succeeding sawing, or, as is technically termed, it is "saw-set." The lever P, secured to the rearward side of the head-block, is adapted to ride over the stop $p$ as the carriage is gigged forward without affecting the catch N; and as this catch is inwardly spring-pressed, it automatically engages again with the slide-recess $n$ as soon as the said slide is moved in an opposite direction away from the saw, just before reaching the end of its forward gigging.

In order to cause such movement in the reciprocation of the slide, the latter is engaged with any form of spring, R, secured to the head-block, and adapted to return the slide in a movement away from the saw. This spring is pressed by the action of the spring-arm $l$ in moving the slide toward the saw, but it is prevented from releasing itself from such compression by means of a catch, S, engaging with a recess in the gage-bar T, which latter is secured to the opposite end of the slide. This catch is inwardly spring-pressed, and is connected with a pendent lever, $s$, pivoted to the forward side of the head-block at alternate opposite end with the lever P. It is adapted to engage with a tripping device, $s'$, formed on the carriage-way, and in such relation to the head-block that just before the carriage reaches the end of its forward gigging said lever engages with said tripping device $s'$, and the slide is free to be moved in a direction away from the saw under the action of the pressed spring R. The lever $s$ is so engaged by connections with the catch S that it rides freely over the tripping device $s'$ in the return gigging of the carriage, and does not operate said catch.

The cross-bar K is so formed on the carriage-way relative to the head-block that simultaneously with this movement of the slide away from the saw the bell-crank lever H engages with said cross-bar, and serves to disconnect the knee from the slide. Hence the slide does not carry the knee with it in this movement; and as soon as said movement has ended the lever H will have completed its engagement with said cross-bar, and connection between the slide and knee again obtains.

Inasmuch as the catch S is spring-pressed, so as to engage with the recess $t$ in the gage-bar T as soon as the movement of the slide toward the saw may permit of such engagement, and since the catch N is similarly spring-pressed, so as to engage with recess $n$ as soon as the movement of the slide away from the saw will permit of such engagement, it is evident that the intermittent reciprocating movement of the slide will be equal in distance to the difference in distance between the catch N when engaging with recess $n$ and the catch S, on the one hand, and the catch N when engaging with recess $n$ and the working recess $t$ in the gage-bar T, on the other hand. Hence the length of movement of the slide is adjustably regulated by the different recesses in the gage-bar, the latter being provided with a recess in each of its several sides; and since it may be formed with any number of sides, and is adapted to be turned on a longitudinal axis, it follows that the said gage-bar may be adjusted so as to cause the reciprocating movement of the slide to be of any desired length. The knee is therefore moved and caused to carry the log with it toward the saw a distance corresponding to the thickness of plank or board to be sawed. This corresponding distance is equal to the thickness of the board or plank plus the cross-section of the saw-kerf. Thus, premising that said board or plank is to be sawed so as to have a thickness of one-half inch, and the saw-kerf has a cross-section of one-quarter of an inch, in such case the gage-bar will be turned so as to present to the catch S a working side in which its recess is three-quarters of an inch farther from catch N when engaging in recess $n$ than is the catch S. Hence the gage-bar can be suitably formed and adjusted upon its axis, so as to saw any desired thickness of stuff.

When it may be desirable to use the head-block without the above-described automatic saw-set adjustment—for instance, in squaring a log or ripping it up into cants six, eight, or ten inches thick—the head-block is adapted for such changed use as follows: The fastening $d$ is turned so as to maintain the bell-crank lever H in the position shown in Fig. 8, by which the pins F are raised from out of the perforations in the slide, and the knee is permitted to move to and from the saw independently of the slide.

A crank-shaft, W, is connected with the knee, and provided with a pinion, $w$, which engages with rack $w'$, formed longitudinally on the head-block.

By this means the automatic movement of the slide does not affect the knee, and the latter is moved, as desired, without reference to the same.

In order to cause the log to be easily moved on the head-block, an endless belt of rollers, Z, is provided, which works in a guideway, $z$, formed on the side of the head-block, said guideway being provided with a horizontal central partition, $z'$, about which the belt is placed, and upon which the upper leaf of the latter has vertical bearing in a continuous horizontal plane throughout its entire length.

Having fully described my invention, what I claim as new, and desire to secure by Letters Patent, is—

1. In a saw-mill head-block, the combination, with a slide having a knee detachably secured thereto, together with a bell-crank lever connected with the same and provided with a horizontal curved spring-arm, of a device formed on the carriage-way, and adapted by engagement with said arm during the return gigging of the carriage to apply tension to the same, tending to move said slide and knee toward the saw, substantially as set forth.

2. The combination, with an adjustable knee, a perforated slide, and vertical pins which connect the two, of a horizontal lever or levers connected with said pins, and a bell-crank lever, which latter is adapted to engage with suitable mechanism formed on the carriage-way, whereby said pins are disconnected with the slide, substantially as set forth.

3. In a saw-mill head-block, the combination, with an adjustable knee, a perforated slide located below the same, and spring-pressed pins which connect the two, of horizontal pivoted levers, which engage with said pins, and a device adapted to fasten the levers, so as to maintain said pins in raised position free from the slide, substantially as set forth.

4. The combination, with an adjustable knee, a perforated slide, and pins which connect the same, of a horizontal lever or levers engaging with said pins, a bell-crank lever adapted to operate the same in disconnecting the knee from the slide, and a catch or other device adapted to maintain the bell-crank lever in such an operating position, substantially as set forth.

5. The combination of the slide provided with a notched or recessed gage-bar and a catch secured to the end of the head-block opposite to that of catch N, together with a lever and mechanism formed on the carriage-way, the same being adapted to disconnect the slide from the head-block just prior to the close of the forward gigging of the carriage, substantially as set forth.

6. In mechanism for automatically adjusting a saw-mill head-block, the combination, with a catch working in a suitable opening formed in the head-block, of a gage-bar secured to the slide and provided with notches or recesses for engaging with said catch, the same being adapted to set the head-block in any desired adjustment toward the saw, substantially as set forth.

7. The combination, with a catch working in a suitable opening formed in the head-block, of the gage-bar secured to the slide and formed with any desired number of sides respectively provided with recesses, said gage-bar being adapted to present any one of its recessed sides toward said catch, substantially as set forth.

8. The combination, with a catch working in an opening in the head-block, of a gage-bar secured parallel to the slide and formed with any desired number of sides respectively provided with engaging recesses for said catch, the gage-bar being adapted to be rotated on its longitudinal axis, and provided with a suitable handle or device for causing said rotating movement, substantially as set forth.

9. In a saw-mill head-block, the combination, with a slide, E, a connecting-lever, L, provided with spring-arm $l$, and a guide, M, with which the latter engages during the return gigging of the carriage, of a catch, N, which engages with said slide-lever P and tripping device $p$, substantially as set forth.

10. In a saw-mill head-block, the combination, with a slide, E, provided with a spring, R, tending to move it away from the saw, and a catch, S, which, by engagement therewith, prevents such movement, of a lever, $s$, connected with the catch, and a tripping device, $s'$, with which said lever engages during the forward gigging of the carriage, all the same being adapted to automatically move said slide away from the saw just prior to the close of said forward gigging, substantially as set forth.

11. In a saw-mill head-block, the combination, with an adjustable knee, D, and a perforated slide, E, located below the same, of one or more spring pressed pins, F, having vertically-sliding movement in said knee, and which engage with the perforated slide, together with lever mechanism adapted to be operated by the forward gigging of the carriage to automatically raise said pins just prior to the close of said forward gigging, substantially as set forth.

12. The combination, with a slide, E, having a knee, D, secured thereto, and formed with a notch, $n$, together with a catch, N, engaging with the latter, of a lever, P, adapted by engagement with a tripping device, $p$, formed on the carriage-way, to automatically disconnect said catch from the slide just prior to the close of the return gigging of the carriage, substantially as set forth.

13. The combination, with a guideway formed on the side of a head-block and provided with a central horizontal partition, of an endless belt of rollers, the upper leaf of which is adapted to have vertical bearing upon said partition continuously throughout its length, substantially as set forth.

In testimony that I claim the foregoing I have hereunto set my hand this 2d day of August, 1878.

JOHN T. JAMES.

Witnesses:
ALBERT M. HOUSTON,
MARGARET HOUSTON.